United States Patent [19]
Johanning et al.

[11] Patent Number: 5,605,589
[45] Date of Patent: Feb. 25, 1997

[54] PNEUMATIC TIRE WITH SPECIFIED SPACING BETWEEN CORDS OF INNER AND OUTER BELTS

[75] Inventors: Gregory S. Johanning, Canton, Ohio; Blaine A. Harrison, Fancy Farm, Ky.; Danny E. Harrison, Union City, Tenn.

[73] Assignee: The Goodyear Tire & Rubber Company, Akron, Ohio

[21] Appl. No.: 399,273

[22] Filed: Mar. 6, 1995

[51] Int. Cl.⁶ .................. B60C 9/18; B60C 9/20
[52] U.S. Cl. ........................... 152/532; 152/526
[58] Field of Search .................. 152/526, 532, 152/537, 530

[56]  References Cited

U.S. PATENT DOCUMENTS

| | | | |
|---|---|---|---|
| 3,583,463 | 6/1971 | O'Neil et al. | 152/537 X |
| 3,608,606 | 9/1971 | Marzocchi | 152/530 |
| 3,799,233 | 3/1974 | Cappa | 152/537 X |
| 3,842,885 | 10/1974 | Alban . | |
| 3,945,421 | 3/1976 | Poque et al. . | |
| 4,691,752 | 9/1987 | Kabe et al. . | |
| 5,014,762 | 5/1991 | Beer et al. . | |
| 5,164,028 | 11/1992 | Uemura . | |
| 5,186,773 | 2/1993 | Oku et al. . | |

FOREIGN PATENT DOCUMENTS

| | | | |
|---|---|---|---|
| 1576353 | 7/1990 | U.S.S.R. | 152/526 |
| 1648806 | 5/1991 | U.S.S.R. | 152/537 |

*Primary Examiner*—Adrienne C. Johnstone
*Attorney, Agent, or Firm*—David L. King; Roger D. Emerson

[57] ABSTRACT

An asymmetric reinforcement belt structure for a pneumatic tire includes an outer belt and inner belt, each reinforced with a plurality of generally parallel cords. The outer belt has a first portion between the centerlines of the cords and a first surface and a second portion between the centerlines of the cords and a second surface. The first portion has a thickness T1 which is between 110% and 150% of T2. Similarly, the inner belt has a third portion and a fourth portion, with the third portion being between the centerlines of the cords and a third surface and a the fourth portion being between the centerlines of the cords and a fourth surface. The fourth portion has a thickness T4 which is between 50% and 90% of a thickness of the third portion T3. Orienting the cords within the belts in this way separates them slightly more than would be so if the belts were symmetrical.

11 Claims, 2 Drawing Sheets

PNEUMATIC TIRE WITH SPECIFIED SPACING BETWEEN CORDS OF INNER AND OUTER BELTS

BACKGROUND OF THE INVENTION

1. Field of Invention

This invention pertains to the art of pneumatic tires and more particularly to reinforcing layers within a tire arranged so as to improve the tire's conicity.

Many pneumatic radial tires are constructed with at least two reinforcing belts and are interposed between the tire's tread and carcass. Typically, the belts are reinforced with cords which cross at angles between 15° and 45° with respect to the circumferential plane of the tire. While this crisscross design of reinforcing cords has many advantages, it can also contribute to a pneumatic tire generating lateral forces. In other words, as the tire is rotated forward in a straight line, certain forces act in a direction perpendicular to the tire's direction, causing the vehicle to vary from its intended course.

One component of lateral force known in the tire industry is "conicity." Conicity can be approximately understood by imagining a cone-shaped tire, tending to roll in a direction other than straight, due to its conical shape.

Tire designers have long sought to reduce or control conicity levels in radial passenger tires. Other designers have created reinforcement belts directed to tire performance parameters other than conicity.

2. Description of the Related Art

In U.S. Pat. No. 5,164,028 to Uemura, a belt is separated by a rubber damper layer disposed therebetween. This design purportedly improves ride comfort and running noise while maintaining the circumferential stiffness of the belt.

In U.S. Pat. No. 3,842,885 to Alban, first and second layers of an elastomeric material are separated by a sheet made of a material with a relatively high modulus of elasticity with respect to the layers. For example, the layers are said to be elastomers while the sheet is said to be a metal, such as stainless steel or aluminum.

Still other belt designs are disclosed in U.S. Pat. Nos. 3,945,421; 4,691,752; 5,014,762 and 5,186,773.

Further improvements over the prior art in terms of controlling or lowering conicity in tires were desirable. Furthermore, manufacturing methods were desired which would allow such improved tires to be manufactured at a high quality and in a cost effective manner.

The present invention provides an improved reinforcement belt structure for use in a pneumatic tire which is particularly well suited for improving conicity in such tires. Also provided is a novel manufacturing method to provide a high quality reinforcement belt structure in a cost effective and simple manner.

SUMMARY OF THE INVENTION

Still other benefits and advantages of the invention will become apparent to those skilled in the art to which it pertains upon a reading and understanding of the following detailed specification.

A reinforcing structure for a pneumatic tire includes an outer belt which is reinforced with a plurality of generally parallel outer cords. The outer belt has a first portion and a second portion. The first portion is between centerlines of the outer cords and a first surface. The second portion is between the centerlines of the outer cords and a second surface. The first portion has a thickness T1 which is greater than a thickness of T2 of the second portion.

According to another aspect of the invention, T1 is about 133% of T2.

According to a still further aspect of the invention, the first portion of the outer belt is radially inward of the second portion of the outer belt.

According to a still further aspect of the invention, the reinforcing structure further includes an inner belt which is reinforced with a plurality of generally parallel inner cords. The inner belt has a third portion and a fourth portion. The third portion is between centerlines of the inner cords and third surface while the fourth portion is between centerlines of the inner cords and a fourth surface. The portion has thickness T3 which is less than a thickness T4.

According to a further aspect of the invention, T3 is about 75% of T4.

According to a further aspect of the invention, a reinforcing structure for a pneumatic tire includes an outer belt, an inner belt, and an intermediate layer. The outer belt and the inner belt are reinforced with a plurality of generally parallel cords. The intermediate layer has a thickness and is between the outer and inner belts. The thickness of the intermediate layer is between 0.010 inches (0.025 cm) and 0.020 inches (0.051 cm).

According to a further aspect of the invention, a method of manufacturing a tire reinforcement structure comprises forming an outer belt so that outer cords in the outer belt are off-center with respect to a thickness of the outer belt, thereby creating a thick portion and a thin portion of the outer belt. Next, forming an inner belt so that inner cords in the inner belt are off-center with respect to a thickness of the inner belt, thereby creating a thick portion and a thin portion of the inner belt. Finally, arranging the outer and inner belts so that the thick portions of each belt are adjacent each other.

Still other benefits and advantages of the invention will become apparent to those skilled in the art upon a reading and understanding of the following detailed specification.

DEFINITIONS

"Aspect ratio" of a tire means the ratio of the section height to the section width.

"Axial" and "axially" are used herein to refer to lines or directions that are parallel to the axis of rotation of the tire.

"Circumferential" means lines or directions extending along the perimeter of the surface of the annular tread perpendicular to the axial direction.

"Cord angle" means a cord that crosses the equatorial plane (EP) at an acute angle, either left of right, and a plane view of the tire, formed by a cord with respect to the equatorial plane. If the cord does not cross the equatorial plane, the "cord angle" means the acute angle formed by the cord with a circumferential line in the ply. The circumferential line passes through a point at which the "cord angle" is to be measured and is contained in a plane parallel with the equatorial plane. The left or right orientation of a cord not passing through equatorial plane is determined by what the orientation would be were the cord extended to cross such plane while remaining in the tire. The "cord angle" is measured in a cured but uninflated tire.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure, including the area occupied by grooves as well as the tread elements.

"Lateral" means an axial direction.

"Radial" and "radially" are used to mean directions radially toward or away from the axis of rotation of the tire.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DETAILED DESCRIPTION OF THE INVENTION

Figure 1:
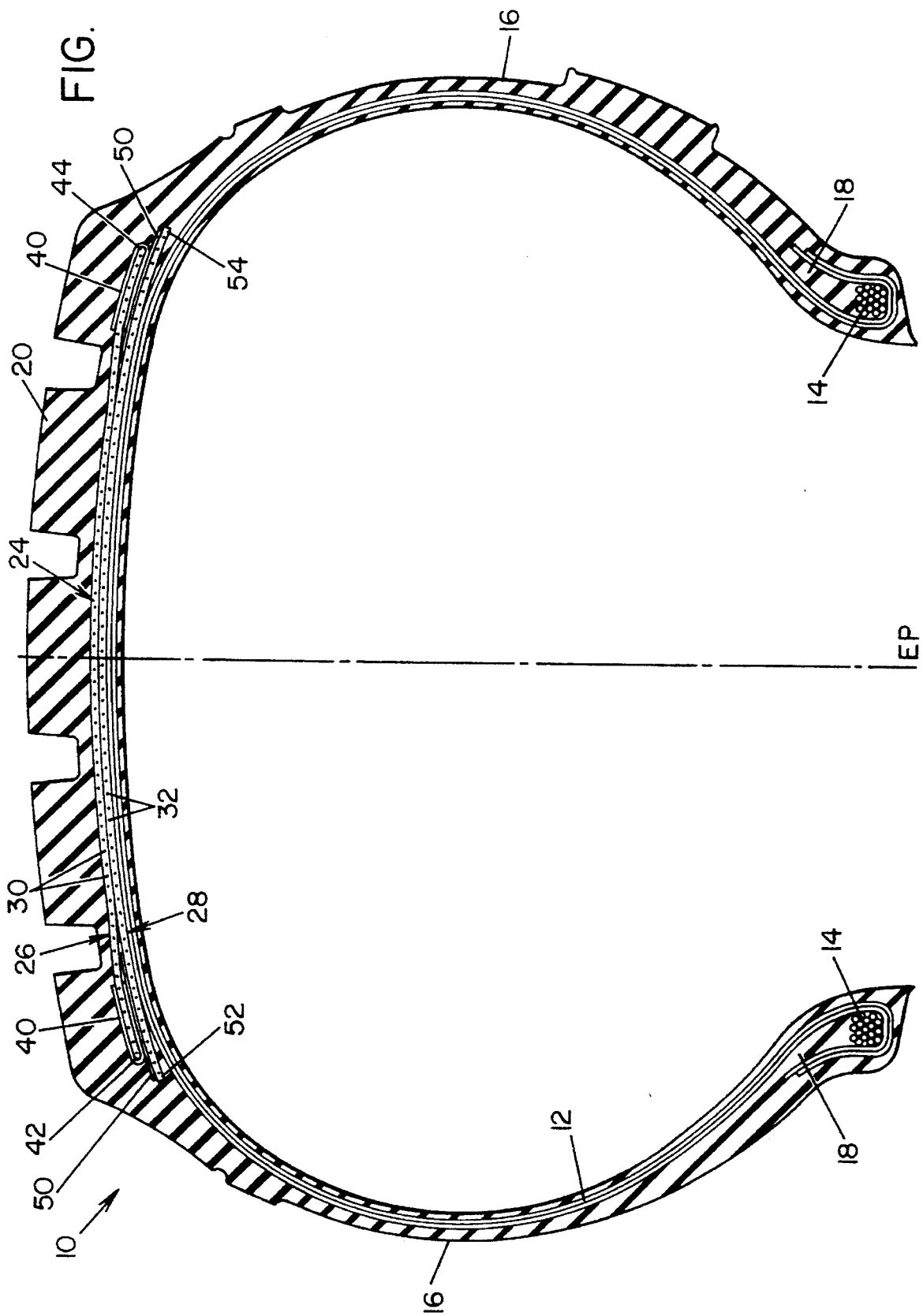
FIG. 1 is a cross-sectional view of a tire incorporating a reinforcing structure according to the invention.

In the drawings, the same numerals are used to designate the same components or items in the several views.

With reference to FIG. 1, a tire 10 has a radial carcass ply or 12 extending between a pair of annular beads 14. In the preferred embodiment, the tire 10 has two carcass plies. A sidewall 16 extends radially outwardly from a bead portion 18 containing the beads 14 therein to a ground-contacting tread portion 20. The tire 10 is reinforced in the crown region by a reinforcing structure 24.

Figure 2:
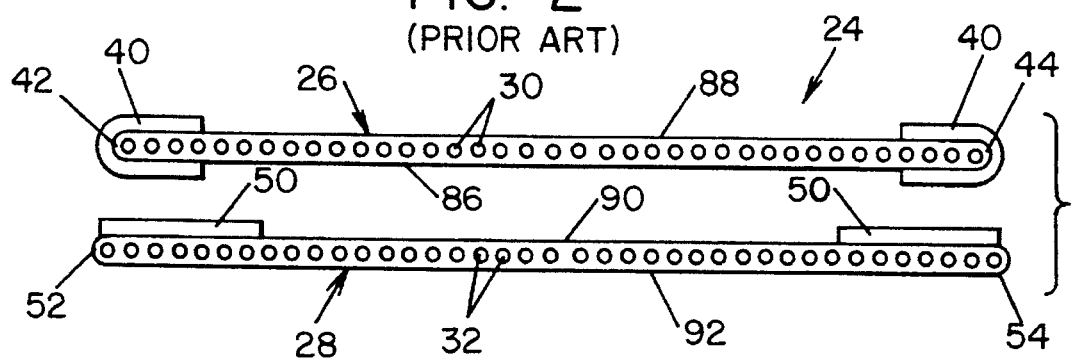
FIG. 2 is a schematic, cross-sectional view of a prior art reinforcing structure taken along a plane passing through the rotational axis of the tire.

With reference to FIG. 2, a typical prior art reinforcing structure is illustrated. The reinforcing structure 24 is located between the carcass ply 12 and the tread portion 20. The reinforcing structure 24 has at least two layers or belt plies 26, 28 of parallel cords 30, 32, woven or unwoven, underlying the tread 20, unanchored to the bead 14 and having both left and right cord angles in the range from 15° to 35° with respect to the equatorial plane (EP) of the tire 10. In the embodiment shown, wrap-around strips 40 are wrapped around the lateral edges 42, 44 of an outer or first belt 26. In addition, gum strips 50 are laid near the lateral edges 52, 54 of an inner or second belt 28. Features such as wrap-around strips 40 and gum strips 50 can be utilized with the invention according to the tire designer's preferences. Other designs which have been contemplated include no gum strips 50 on either of the belts 26, 28 and extra wide gum strips 50.

Figure 3:
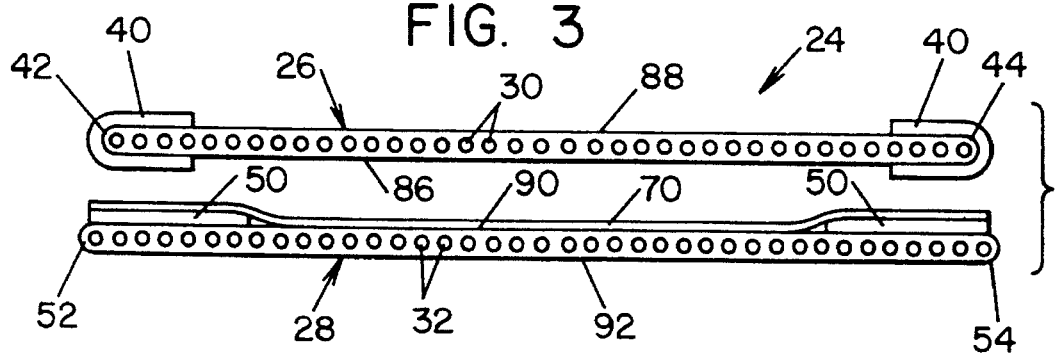
FIG. 3 is a schematic, cross-sectional view of a reinforcing structure according to the invention, taken along a plane passing through the rotational axis of the tire.
Figure 4:
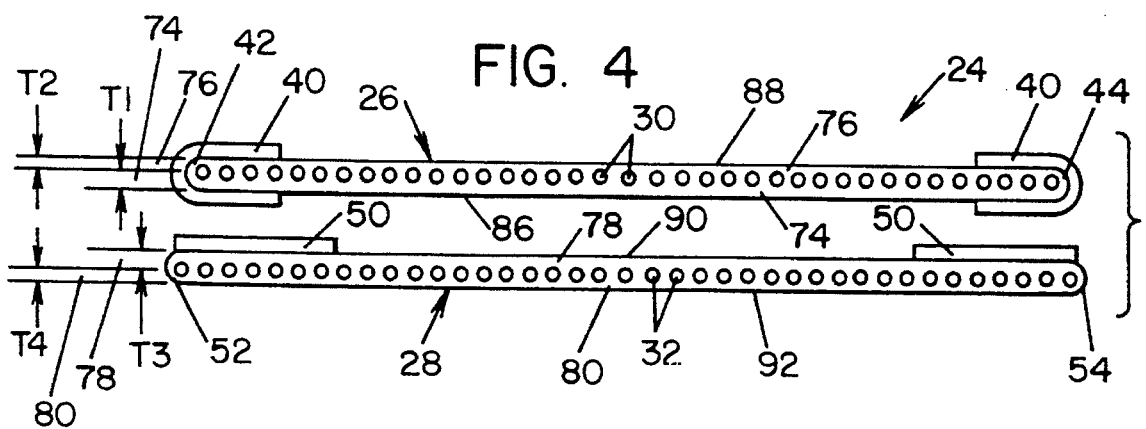
FIG. 4 is a schematic, cross-sectional view of another embodiment reinforcing structure according to the invention, taken along a plane passing through the rotational axis of the tire.

With reference to FIGS. 2-4, the invention will now be discussed. As can be seen in FIG. 2, in the prior art reinforcing structure 24, the cords 30, 32 are essentially centered in the middle of the thickness of the respective belts 26, 28. Although the belts 26, 28 are shown displaced apart an exaggerated distance to assist in the understanding of the invention, a first surface 86 of the outer belt 26 actually lies next to and touching a third surface 90 of the inner belt 28. Therefore, the distance between a plane containing the cords 30 in the outer belt and a plane containing the cords 32 in the inner belt is established by the amount of elastomeric material between planes. This distance is equal to the sum of the distance between the plane containing the cords 30 and the first surface 86 of the outer belt 26 and the distance between a plane containing the cords 32 and the third surface 90 of the inner belt 28.

This measurement is important to good tire performance in regards to conicity. It has been learned that the distance between the centerlines of the respective layers of cords 30, 32 is a primary contributor to conicity in the tire.

With reference to FIG. 3, one embodiment of the invention will be illustrated. Similar elements shown in the various views are identified by the same reference characters.

Comparing the embodiments shown in FIG. 2 and FIG. 3 shows the only difference to be an intermediate layer 70 interposed between the first surface 86 of the outer belt 26 and the third surface 90 of the inner belt 28. Preferably, the intermediate layer 70 is not reinforced but is made only of rubber or other suitable elastomer and is of a thickness between 0.010 inches (0.025 cm) and 0.020 inches (0.051 cm). In the preferred embodiment, the intermediate layer 70 is equal to 0.015 inches (0.038 cm). The dimensions of the intermediate layer 70 may change depending on the size of the tire 10 in question. The thickness of the intermediate layer 70 should be between 25% and 50% the thickness of a belt 26, 28.

A tire incorporating the embodiment of reinforcing structure 24 shown in FIG. 3 performed well in handling evaluations and had measured lowered conicity. For example, trials were run measuring the conicity of a Goodyear Wrangler AT tire in the P235/75R15 size. Regular production tires of this tire type and size feature a reinforcing structure 24 as shown in FIG. 2 and typically generate conicity between 13 lbs (5.9 kg) and 14 lbs (6.4 kg) for every millimeter that the outer belt 26 is off-center. When the tire design was changed to the reinforcing structure 24 illustrated in FIG. 3, the conicity was reduced to 7.3 lbs (3.3 kg) for every millimeter that the outer belt 26 is off-center.

Although the embodiment of the invention shown in FIG. 3 has proven effective, the preferred embodiment is illustrated in FIG. 4. One of the disadvantages of the embodiment illustrated in FIG. 3 is the extra component represented by intermediate layer 70. This extra component requires an extra step in the tire building process, as well as the attendant extra manufacturing costs of manufacturing it, storing it, testing it, etc. In the embodiment shown in FIG. 4, when the outer belt 26 was calendared, extruded, or otherwise formed, essentially one-half of the thickness of the intermediate layer 70 has been added to the first surface 86 of the outer belt 26 while the other half of the thickness of the intermediate layer 70 has been added to the third surface 90 of the inner belt 28. More specifically, with continuing reference to FIG. 4, the outer belt 26 is reinforced with a plurality of generally parallel outer cords 30. The outer belt 26 has a first portion 74 and a second portion 76. The first portion 74 is between the centerlines of the outer cords 30 and the first surface 86. The second portion 76 is between the centerlines of the outer cords 30 and the second surface 88.

Similarly, in the inner belt 28, a third portion 78 is between the centerlines of inner cords 32 and the third surface 90. The fourth portion 80 is between the centerlines of the inner cords 32 and the fourth surface 92.

The thickness of T1 of the first portion 74 is greater than the thickness T2 of the second portion 76. The thickness T1 is between 110% and 150% of T2 and is preferably about 133% of T2.

The fourth portion 80 has a thickness T4 which is less than the thickness T3 of the third portion 78. The thickness T4 is between 50% and 90% of T3 and is preferably about 75% of T3.

In the Goodyear Wrangler AT tire of a P235/75R15 size, the thicknesses T1 and T3 of the first portion 74 and third portion 78, respectively, were equal to 0.032 inches (0.08 cm) while the thicknesses of T2 and T4 of the second portion 76 and fourth portion 80, respectively, were equal to 0.024 inches (0.06 cm).

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

It is claimed:

1. A pneumatic tire having a reinforcing structure, said reinforcing structure comprising:

a first belt, said first belt being reinforced with a plurality of generally parallel first cords, said first belt having a first portion and a second portion, said first portion of said first belt being between centerlines of said first cords and a first surface, said second portion of said first belt being between said centerlines of said first cords and a second surface, said first portion having a thickness T1 which is greater than a thickness T2 of said second portion wherein T1 is between 110% and 150% of T2.

2. The pneumatic tire of claim 1 wherein T1 is about 133% of T2.

3. The pneumatic tire of claim 1 wherein said first portion is radially inward of said second portion.

4. The pneumatic tire of claim 1 with said reinforcing structure further comprising:

a radially inner second belt, said first portion of said first belt being between said second belt and said first cords.

5. The pneumatic tire of claim 1 with said reinforcing structure further comprising:

a radially inner second belt, said second belt being reinforced with a plurality of generally parallel second cords, said second belt having a third portion and a fourth portion, said third portion being between centerlines of said second cords and a third surface, said fourth portion being between said centerlines of said second cords and a fourth surface, said fourth portion having a thickness T4 which is less that a thickness T3 of said third portion.

6. The pneumatic tire of claim 5 wherein T4 is between 50% and 90% of T3.

7. The pneumatic tire of claim 5 wherein T4 is about 75% of T3.

8. The pneumatic tire of claim 5 wherein said third portion is radially outward of said fourth portion.

9. The pneumatic tire of claim 1 with said reinforcing structure further comprising:

a wrap-around strip, said wrap-around strip being wrapped around one edge of said first belt.

10. The pneumatic tire of claim 5 with said reinforcing structure further comprising:

a gum strip, said gum strip being laid on said second belt near an edge of said second belt.

11. A pneumatic tire having a reinforcing structure, said reinforcing structure comprising:

a first belt, said first belt being reinforced with a plurality of generally parallel first cords, said first belt having a first portion and a second portion, said first portion of said first belt being between centerlines of said first cords and a first surface, said second portion of said first belt being between said centerlines of said first cords and a second surface, said first portion having a thickness T1 which is greater than a thickness T2 of said second portion, said first portion being radially inward of said second portion; and, a radially inner second belt, said second belt being reinforced with a plurality of generally parallel second cords, said second belt having a third portion and a fourth portion, said third portion of said second belt being between centerlines of said second cords and a third surface, said fourth portion of said second belt being between said centerlines of said second cords and a fourth surface, said fourth portion having a thickness T4 which is less than a thickness T3 of said third portion, said third portion being radially outward of said fourth portion.

* * * * *